(12) United States Patent
Maibach et al.

(10) Patent No.: US 10,761,033 B2
(45) Date of Patent: Sep. 1, 2020

(54) TESTING METHOD AND TESTING SYSTEM (71) Applicant: Finatec Holding AG, Brugg b. Biel (CH)

(72) Inventors: Fridolin Maibach, Safnern (CH); Matthias Hermle, Brugg b. Biel (CH)

(73) Assignee: Finatec Holding AG, Brugg b. Biel (CH)

( * ) Notice: Subject to any disclaimer, the term of this patent is extended or adjusted under 35 U.S.C. 154(b) by 0 days.

(21) Appl. No.: 15/573,930

(22) PCT Filed: May 13, 2016

(86) PCT No.: PCT/EP2016/060904
§ 371 (c)(1),
(2) Date: Nov. 14, 2017

(87) PCT Pub. No.: WO2016/184816
PCT Pub. Date: Nov. 24, 2016

(65) Prior Publication Data
US 2018/0246043 A1     Aug. 30, 2018

(30) Foreign Application Priority Data

May 18, 2015 (CH) ...................................... 0685/15

(51) Int. Cl.
*G01N 21/90*     (2006.01)
*G06T 7/00*     (2017.01)
(Continued)

(52) U.S. Cl.
CPC ......... *G01N 21/9081* (2013.01); *B07C 5/126* (2013.01); *B65D 23/02* (2013.01);
(Continued)

(58) Field of Classification Search
CPC ............ G01N 21/9081; G01N 21/8806; B07C 5/126; B65D 23/02; B65D 23/0807;
(Continued)

(56) References Cited

U.S. PATENT DOCUMENTS

| | | |
|---|---|---|
| 5,898,169 A | 4/1999 | Nordbryhn |
| 9,638,579 B2 | 5/2017 | Hermle et al. |

(Continued)

FOREIGN PATENT DOCUMENTS

| | | |
|---|---|---|
| CH | 707559 A2 | 9/2014 |
| CH | 707705 A1 | 9/2014 |

(Continued)

OTHER PUBLICATIONS

International Search Report for PCT/EP2016/060904, dated Jul. 20, 2016, 12 pages.

*Primary Examiner* — Leon Viet Q Nguyen
(74) *Attorney, Agent, or Firm* — Praedcere Law (57) ABSTRACT

The present invention relates to a testing method and a corresponding testing system, for example for testing workpieces (2), which are provided for producing containers, in particular beverage bottles, and which can consist of a basic body and a barrier layer that is at least partially applied to the basic body, whereby the workpieces (2) are transported into a receiving vessel (4) by means of a transport device (3), and whereby an image of the workpieces (2) is generated by means of a capturing device (6) and is transmitted to a processing device for testing, wherein the workpieces (2) are led into the receiving vessel (4) upon leaving the transport device (3), whereby the image is generated between the departure from the transport device (3) and the receiving vessel (4) and wherein the image is processed by the processing device in such a way that the quality of the basic body and/or the quality of the barrier layer of the workpieces (2) is tested in order to detect defective workpieces (2). The (Continued)

same testing system and the same testing method can also be used to count the workpieces (2).

25 Claims, 10 Drawing Sheets

(51) Int. Cl.
    *B07C 5/12*     (2006.01)
    *B65D 23/02*     (2006.01)
    *B65D 23/08*     (2006.01)
    *B65D 41/02*     (2006.01)
    *G01N 21/88*     (2006.01)

(52) U.S. Cl.
    CPC ......... *B65D 23/0807* (2013.01); *B65D 41/02* (2013.01); *G01N 21/8806* (2013.01); *G06T 7/001* (2013.01); *G06T 7/0004* (2013.01); *B65D 2201/00* (2013.01); *G06T 2207/10024* (2013.01); *G06T 2207/30164* (2013.01)

(58) Field of Classification Search
    CPC .... B65D 41/02; B65D 2201/00; G06T 7/001; G06T 2207/10024; G06T 2207/30164
    See application file for complete search history.

(56) References Cited

U.S. PATENT DOCUMENTS

| | | | |
|---|---|---|---|
| 2005/0041848 A1* | 2/2005 | Thomas | B29C 49/80 382/141 |
| 2006/0219609 A1* | 10/2006 | Canepa | B07C 5/3404 209/552 |
| 2007/0017593 A1* | 1/2007 | Bernhard | B65C 9/40 141/2 |
| 2008/0310701 A1* | 12/2008 | Caroli | G01B 11/25 382/141 |
| 2010/0193332 A1* | 8/2010 | Beyerer | B07C 5/02 198/604 |
| 2013/0056398 A1* | 3/2013 | Adams | B07C 5/342 209/587 |
| 2015/0049182 A1 | 2/2015 | Scharer et al. | |

FOREIGN PATENT DOCUMENTS

| | | |
|---|---|---|
| EP | 1479454 A1 | 11/2004 |
| WO | WO2015014488 A1 | 2/2015 |

* cited by examiner

TESTING METHOD AND TESTING SYSTEM

TECHNICAL FIELD OF THE INVENTION

The present invention relates to a testing method and a corresponding testing system. Specifically the present invention relates to a testing method and a corresponding testing system which are especially suitable for testing the characteristics of the workpieces required in connection with the production of beverage bottles and other similar containers. Examples of such objects include the so-called "preforms", i.e. preforms or blanks from which beverage bottles are produced in a separate working process, but also caps for the beverage bottles and all articles which are needed in the process of production of beverage bottles. The present invention relates specifically to a method and a corresponding system for testing of preforms, in which, during the transport of the preforms, an image thereof is made in each case by means of a capturing device and is examined by a testing device.

For the sake of completeness, it should be said here that by the term "preform", which is used in the following, in principle all objects are to be understood that are used for the production of beverage bottles and similar containers as well as all other similar objects that are similar to the conventional preforms with respect to the production process or respectively the structure and/or appearance. Examples of such objects are e.g. syringes (for use in the medical or laboratory field), test tubes, cuvettes, etc.

STATE OF THE ART

In the production of containers, in particular beverage bottles, the preforms, i.e. preforms or blanks, are generally produced first, and these preforms are then further processed into the finished containers. These preforms are typically made of plastic, above all PET (polyethylene terephthalate). Other similar articles, such as the above-described syringes, test tubes, cuvettes, etc. but also plastic caps (closures) for beverage bottles, among other things, are produced in a similar fashion.

Because production processes are energy-intensive and because production operations have to be shut down, as a rule, upon discovery of non-flawless preforms (whereby higher costs arise), produced preforms as well as other mentioned objects similar to preforms are checked, as a rule, for the presence of defects before they are sent for further processing. Possible defects are above all imprecise dimensions, inexact shape, too thin or too thick wall areas, pin holes, burns, the presence of foreign bodies and/or bubbles or defective color quality.

Moreover certain preforms and also caps have the so-called barrier layer. As a matter of fact, the materials from which preforms are made are usually not completely tight. In other words, with time, the contents can escape from the containers, which can lead to a denaturation of the contents. For example, the gas from carbonated drinks escapes through the walls of the PET bottle or through the places of contact between the bottle and the cap, which in time causes a bad taste of the drink. Barrier layers are therefore applied in order to resolve this problem and to prevent the contents enclosed in a bottle from escaping. Moreover barrier layers are also used in a reverse way, if substances should be prevented from penetrating into the interior of the container. For example, an oxygen-impermeable barrier layer can be used to protect sensitive products inside the container against oxidation. Also in this type of barrier layers defects can arise which should be detected as reliably as possible.

Last but not least, there exists in many applications the need to determine accurately the number of objects to be checked or the number of ojects checked (and among them also the number of defective or respectively incorrect objects). Since manual counting requires a great amount of effort, automated counting methods are also used for this purpose, thanks to which the number of desired workpieces can be determined exactly.

Various systems and methods are known for testing of preforms and other similar objects for such defects. In particular checking with the aid of digital capturing devices in particular has thereby become established. In so doing, either preforms are moved in front of a capturing device, so that in each case one or more images of each preform can be made, or, alternatively, the preforms to be checked are stationary in each case while the capturing device moves. In both cases, an electronic processing device compares the images taken with a reference picture and determines whether the respective preform is flawless or whether it has certain defects. Non-conforming comparative values lead to the elimination of the respective blank or preform. At the same time the counting of the number of objects can also be carried out.

With barrier layer, a purely optical check does not lead to any satisfactory result since this layer is usually transparent, so that it is not visible or not well visible by daylight. The barrier layers in the bottle caps also have to be checked in a special way since they are often not accessible for a conventional optical check owing to the material of the cap. For testing of barrier layers infrared cameras are therefore employed, for example, with which the defects in transparent or respectively optically covered layers can also be detected.

Most of the systems or respectively methods known so far are essentially based however on an order and alignment of the objects to be tested since an image of each object in a desired position is supposed to be made. In addition there exist also systems or respectively methods in which the objects to be tested can be checked in an unordered way. However, such systems or methods are known so far only for the checking of color quality.

SUMMARY OF INVENTION

It is therefore an object of the invention to propose a testing method as well as a suitable testing system for carrying out this testing method in which the above-described drawbacks of the known systems and methods are completely overcome or at least greatly reduced.

In particular, an object of the invention is to propose a testing method and the corresponding testing system thanks to which a reliable, quick and very simple automatic checking of the quality of a whole series and the counting of the number of workpieces, with a system taking up little space, are ensured. In addition, the installation of this system on the existing production machines should be able to be carried out very simply.

These objects are achieved according to the present invention through the elements of the two independent claims. Further advantageous embodiments follow moreover from the dependent claims and from the description.

In particular these objects of the invention are achieved in that in the testing method for testing workpieces, which are provided for producing containers, in particular beverage bottles, and which can consist of a basic body and a barrier layer that is at least partially applied to the basic body, whereby the workpieces are transported into a receiving vessel by means of a transport device, and whereby an image of the workpieces is generated by means of a capturing device and is transmitted to a processing device for testing, the workpieces are led into the receiving vessel upon leaving the transport device, whereby the image is generated between the departure from the transport device and the receiving vessel, and the image is processed by the processing device in such a way that the quality of the basic body and/or the quality of the barrier layer of the workpieces is tested in order to detect defective workpieces.

It should be stated here that it is absolutely possible for there to be workpieces that have no barrier layer. Moreover, the barrier layer, if it is present, can be situated either on the outside (i.e. the surface turned toward the outside) or on the inside (i.e. the inwardly directed surface) of the basic body of the workpiece. Lastly, it is also conceivable that the barrier layer is located between two substrates of the basic body (i.e. neither outside nor inside).

The advantage of this invention lies especially in that defective workpieces, namely preforms or caps, but also other similar objects, can be very simply discovered, and, to be precise, with respect to a whole series of defects, including defects in the barrier layer, in particular also without their having to be specially aligned. Furthermore hardly any adjustment is needed in the existing production facilities.

However it should still be mentioned here that, besides the above-described testing method according to the invention, the present invention also relates to a corresponding testing system.

The invention will be presented with reference to a plurality of embodiments. The individual technical features of one embodiment can absolutely be used also in combination with another embodiment with the presented advantages. The description of the technical features according to the invention are thus not limited to the respective embodiment.

BRIEF DESCRIPTION OF THE DRAWINGS

Embodiments of the present invention will be described in the following with reference to examples. The examples of the embodiments are illustrated by the following attached figures.

DETAILED DESCRIPTION OF THE EMBODIMENTS

Figure 1:
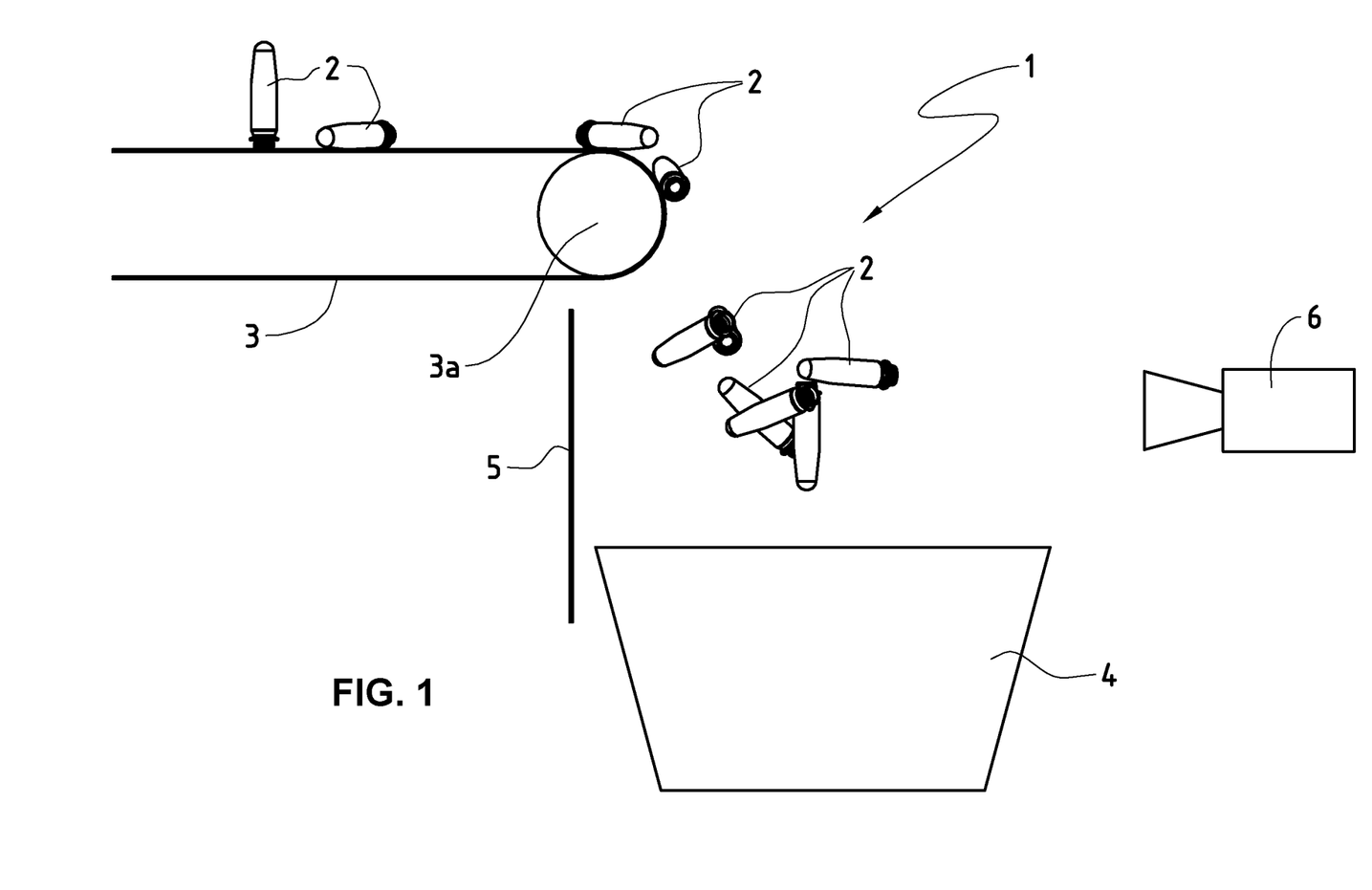
FIG. 1 shows schematically a lateral view of a testing system according to a first embodiment of the present invention.
Figure 2:
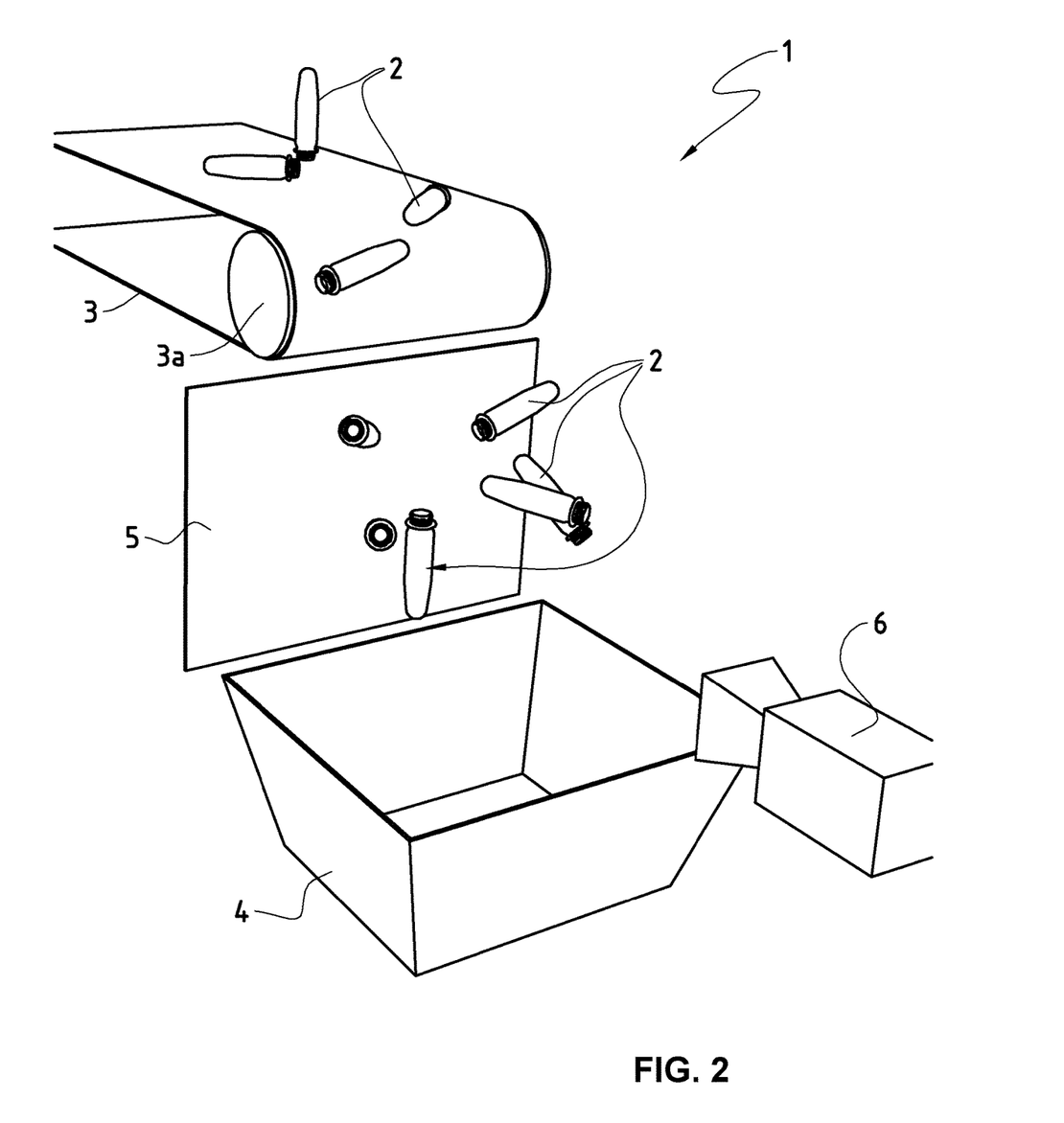
FIG. 2 shows the testing system illustrated in FIG. 1 in a perspective view from the front.

Illustrated in FIG. 1 and FIG. 2 is schematically a first embodiment of a testing system 1 according to a first embodiment of the present invention. As already mentioned several times, the testing system according to the invention can be used advantageously for the testing of preforms for the production of beverage bottles of plastic. For the sake of simplicity, in the following description, reference will always be made to the testing of preforms, except when special reference is made to the peculiarities of testing of other workpieces. Nevertheless it is understood that the described elements of the testing system according to the invention and of the testing method according to the invention relate, so to speak, to the testing or respectively counting of other corresponding workpieces (e.g. caps).

The preforms 2 of plastic (e.g. of PET) produced in a conventional production machine or respectively in a conventional production system are transported by the transport device 3 to a receiving vessel 4. This transport takes place essentially in an orderless way. Understood by this term should be an arrangement of preforms which results "naturally", i.e. without a prior ordering or sorting. Of course it is also conceivable that the preforms 2 are also put in order by the transport device 3 during the transport, i.e. that they have a predetermined alignment upon leaving the transport device 3, for example. Of course the present invention displays its advantages also in such a case.

Moreover it is conceivable that, after leaving the transport device 3, the preforms 2 are not transferred to a receiving vessel 4, but instead to a further transport device. The present invention nevertheless functions in the same way also in this alternative case. The transport device 3 in FIGS. 1 and 2 is a conventional conveyor belt with a drive roller 3a, which is driven by means of a drive (not shown). It is however conceivable of course to use another suitable transport device instead of a conveyor belt, for example a vacuum conveyor system or a gripping device.

After leaving the transport device 3, the transported preforms 2 reach a schematically represented receiving vessel 4. The receiving vessel 4 can thereby be a simple cardboard box which is closed by the operating personnel after filling and is carried away, or however a more complex receiving container, which can be used automatically or semi-automatically for packaging and storing of the preforms 2. Instead of the receiving container 2 <sic. 4> another conveyor belt, a so-called cooling conveyor or another similar device can be provided. This is used in particular when the tested preforms 2 have to be subjected to a further check and/or treatment.

As can be seen very well with reference to FIGS. 1 and 2, the preforms 2 are orderless during the transport on the transport device 3 as well as during the introduction into the receiving vessel 4. In other words, the preforms 2 are brought directly out of the production machine, without any alignment or ordering on the transport device 3 and are transported in this state all the way into the receiving vessel 4. When however, as already mentioned above, the preforms 2 come out of the production machine in an ordered way, it can also happen that they are likewise transported on the transport device 3 in this ordered way. The present invention would clearly also work perfectly in such a situation, but is in no way dependent upon such an alignment or ordering.

Represented on the right side in FIG. 1 or respectively in FIG. 2 is a capturing device 6. It can thereby be, for example, a very conventional digital (or also analog) camera. On the other hand, the capturing device 6 can also be a device which makes possible the generation of a so-called optical coherence tomogram or the taking of so-called multispectral images. Such a device (e.g. a multispectral camera) can be used in particular for testing the quality of the barrier layer in the preforms.

Optical coherence tomography (or OCT) is an examination procedure in which light of minimal coherence length is used with the aid of an interferometer for distance measurement of dispersed materials. The object being examined is scanned in a pointwise way. Specifically this OCT technology allows the topography of a surface and inner structures to be made visible. Used as light sources are broadband super luminescent diodes as well as laser sources in the near infrared wavelength range between 600 and 1700 nm. In so doing short coherent light in the said wavelength range is beamed into the object to be tested and the light scattered back is evaluated. Thanks to these images, volume data (i.e. three-dimensional data) can be calculated, thanks to which, for example, the thickness of the barrier layer can be determined.

The multispectral images are usually digital image data which are made up of a plurality of spectral channels. Specifically the multispectral images contain information about reflected or emitted electromagnetic radiation of differing wavelengths. For this purpose the same pictures are taken with reactions to different colors, from which a uniform picture is put together later. Such multispectral images are especially well suited for determining the thickness of the barrier layer, among other things.

Of course the invention is not limited to these three examples, and one skilled in the art will easily know other capturing devices which can be used instead of the conventional digital camera or respectively instead of a device for generation of optical coherence tomograms or a multimodal camera. The capturing device 6 is connected to a processing device (not shown).

The preforms 2 transported on the transport device 3 generally in an unordered way leave this transport device 3, likewise in an unordered way, and then fall (through the effect of gravity) into the receiving vessel 4. At this moment, i.e. precisely between the leaving from the transport device 3 and the falling into the receiving vessel 4, a picture is taken of each of the passing falling preforms 2 by the capturing device 6 and is transmitted to the processing device for testing. Depending upon the choice of capturing device 6 either a "regular" digital or analog photo, an optical coherence tomogram or a multispectral image is produced. Combinations of these different images are also conceivable. Also conceivable is moreover to carry out a series of several pictures, instead of a single image, so that in each case selected for examination can be the image taken in which at least a representative number of pictured preforms 2 to be tested have the optimal position. The conclusions about the total number of preforms can be made from this representative number.

Instead of, or in addition to, testing of the preforms, their number can also be determined. For this purpose the taken images are likewise evaluated by the evaluation unit, whereby other algorithms are then used. In this way a very precise and simple counting can be achieved.

In the first embodiment shown in FIGS. 1 and 2, a projection screen or respectively a screen device 5 can be provided behind the falling preforms 2 (seen from the perspective of the capturing device 6), the function of which will be explained later. However it is also possible to achieve this first embodiment of the present invention without the projection screen 5.

Figure 3:
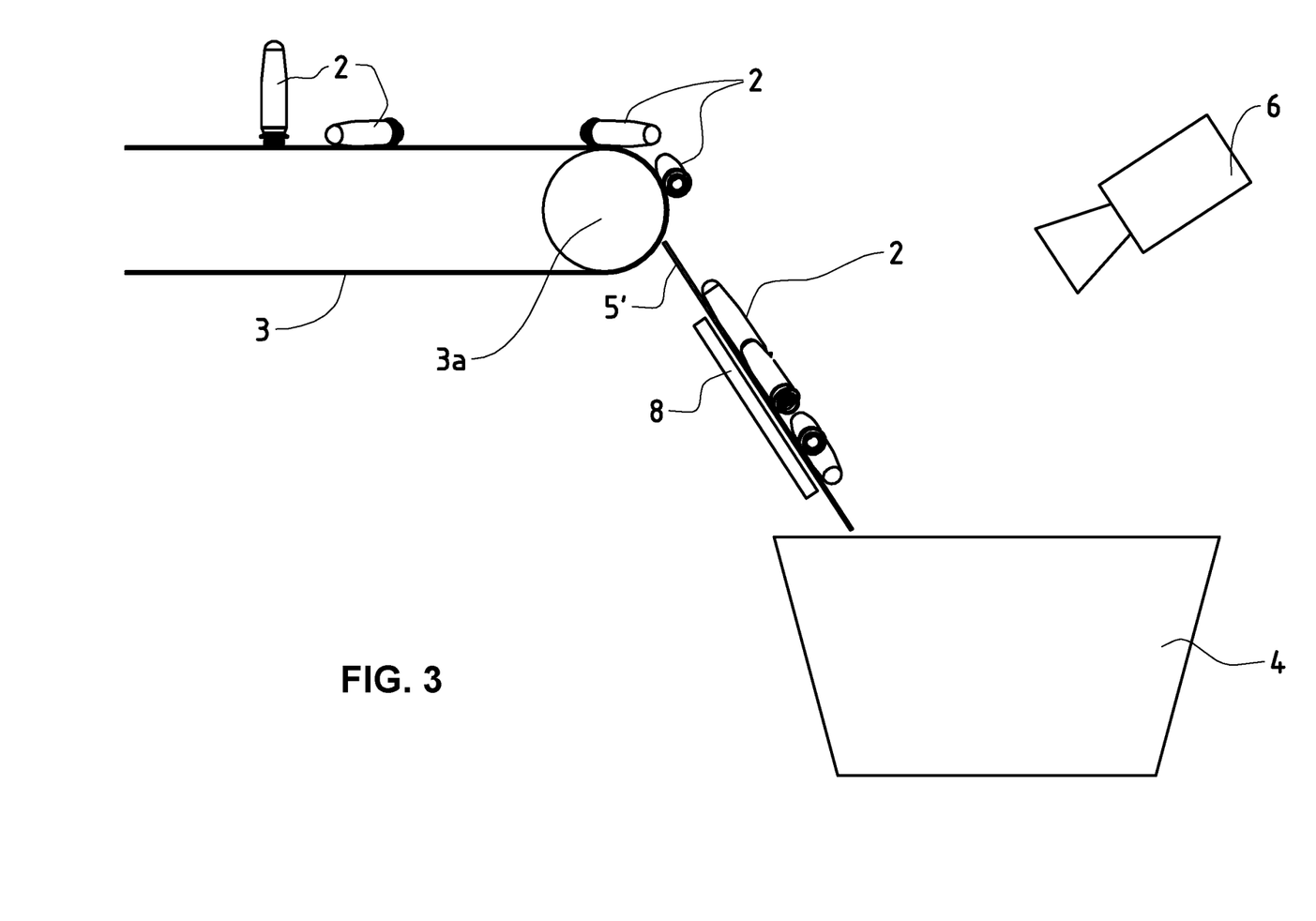
FIG. 3 shows schematically a lateral view of a testing system according to a second embodiment of the present invention.
Figure 4:
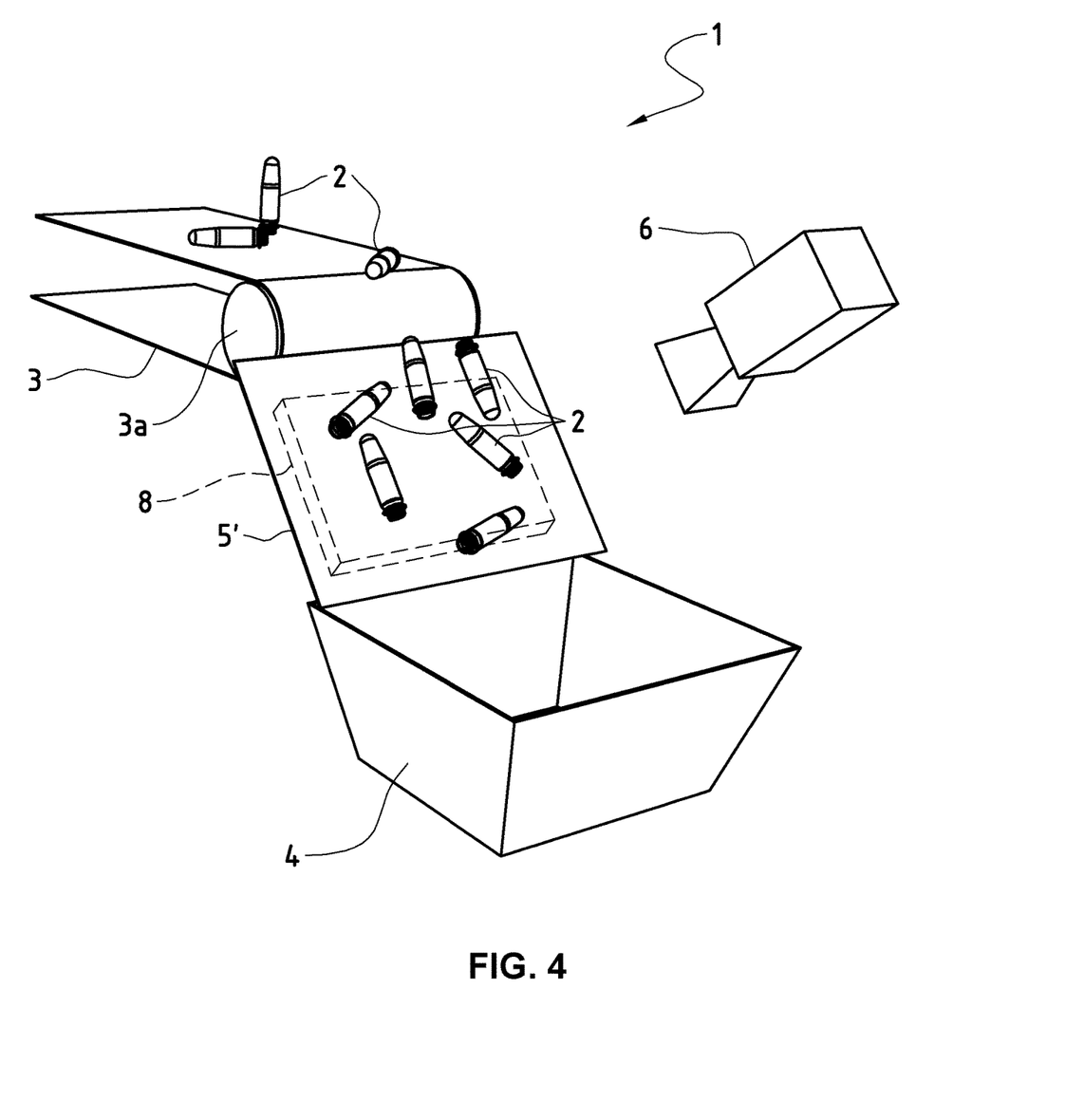
FIG. 4 shows the testing system illustrated in FIG. 2 <sic. 3> in a perspective view from the front.

Illustrated in FIG. 3 and FIG. 4 is schematically a system 1 for testing of preforms according to a second embodiment of the present invention.

Same parts and devices corresponding to those of the first embodiment and having the same function have been labelled with the same reference numerals.

The preforms 2 transported on the transport device 3 in a basically unordered way leave this transport device 3 likewise in an unordered way and then end up on a plate 5', over which they are able to slide (in particular through the effect of gravity), in order to be introduced into the receiving vessel 4. During the sliding on the plate 5' the preforms 2 are also unordered, but all lie in the plane of the plate 5' however. During the sliding on the plate 5', i.e. between the leaving from the transport device 3 and the falling into the receiving vessel 4, an image (i.e. a photo, an optical coherence tomogram or a multimodal picture) is made in each case of the passing falling preforms 2 by the capturing device 6 and is transmitted to the processing device for examination. It is also conceivable, instead of making a single image, to carry out a series of several images so that in each case selected for evaluation can be the image taken in which the preforms 2 imaged for testing have the optimal position.

Figure 5A:
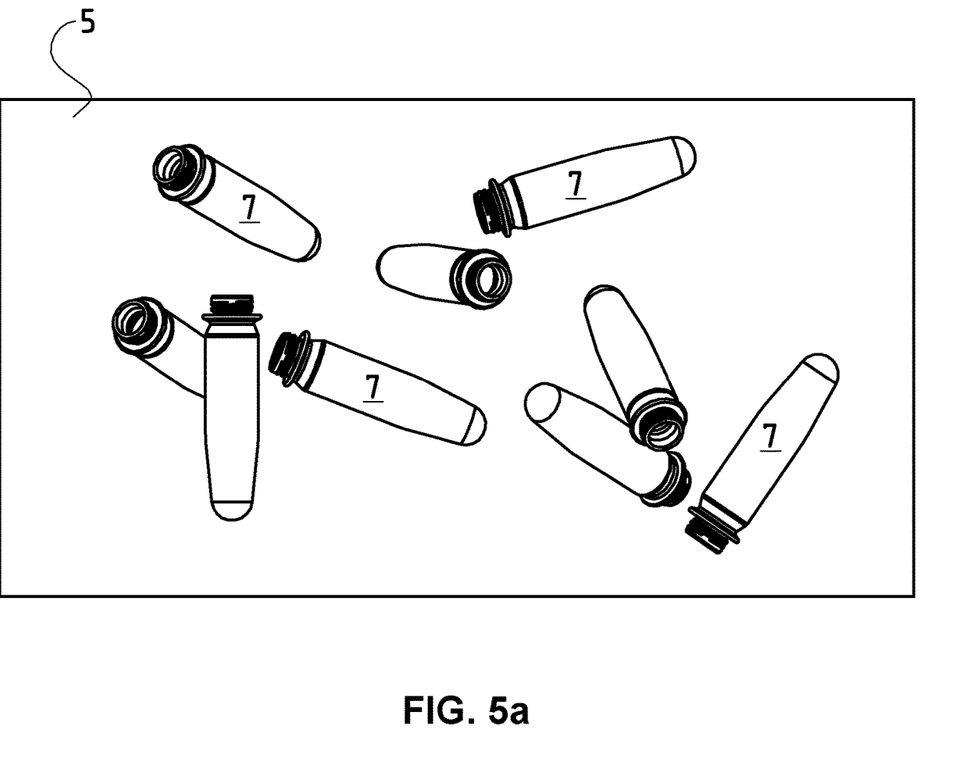
FIGS. 5a and 5b show schematically a representation of a possible image that is made by a capturing device in the testing system of FIG. 1 or respectively FIG. 3 and is evaluated by a processing unit during the testing of preforms.
Figure 5B:
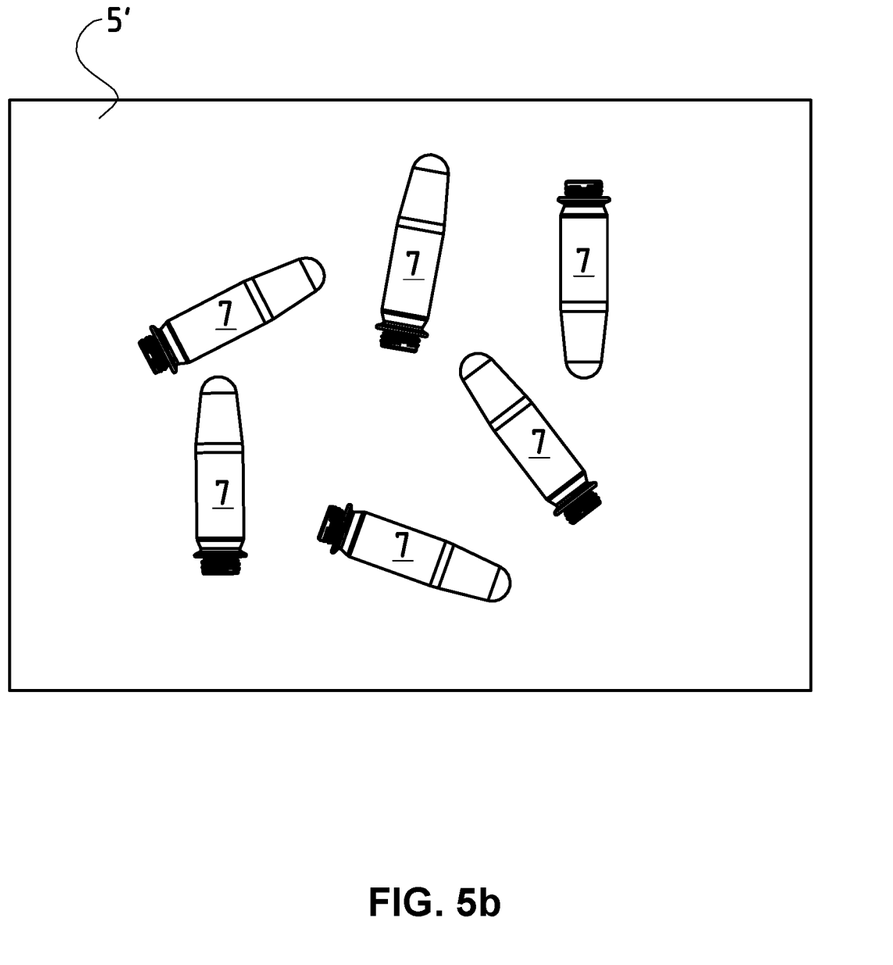

Illustrated in a purely schematic way in FIGS. 5a and 5b is an image which was made by a system according to the first or respectively second embodiment of the invention. Images of a plurality of preforms can be identified in this picture. In the background of the picture the projection screen 5 can be seen in FIG. 5a and the plate 5' in FIG. 5b. In FIGS. 5a and 5b the images of preforms bear the reference numeral 7 (instead of 2), so that they can be distinguished from the "genuine" preforms. This means that the preforms labelled with 7 represent preforms that are representative for all preforms. The preforms 7 lie in a region in front of the projection screen 5 which is suitable for obtaining images that are suitable for evaluation by the processing device. The region is defined e.g. by a spacing apart from the capturing device 6.

In the exemplary image according to FIG. 5a it can be seen that the preforms 7 are unordered. In this sense the imaging of certain preforms 7 is incomplete under some circumstances since they are completely or partially covered by other preforms. Moreover it can be seen that some preforms 7 in the image made are at an angle with respect to the projection screen 5 (or respectively in relation to the plane which is perpendicular to the direction of view of the capturing device 6), whereby only a portion of their surface can be seen in the picture. In an extreme case it is conceivable that a preform 7 is located during free fall exactly in the direction of view of the capturing device 6. In this situation only the capturing of the preform head or respectively of the preform bottom would be able to be seen in the corresponding picture.

As can be seen in FIG. 5b, in the case of a plate 5', all preforms 7 lie in the same plane, i.e. in the plane of the plate 5', so that they are always at an optimal angle with respect to the capturing device 6. In this way it can be ensured that a large number of images taken of the preforms 7 are able to be used for evaluation.

The projection screen 5 can be composed of different materials, for example plastic or textile. The plate 5' can also consist of many materials, for example plastic, glass or metal, and can also consist of a combination of materials.

Special fixing means can be provided (not shown), for example frames or suspension hooks, for fixing, or respectively for correct positioning, of the projection screen 5 or plate 5'. In particular it is possible and advantageous to provide such fixing means with which the plate 5' can be attached directly to the transport device 3.

Also visible in FIGS. 3 and 4 is an illuminating body 8 behind the plate 5'. It is practical when the illuminating body 8 is positioned in such a way that the preforms 2 sliding on the plate 5' are illuminated through the transparent region of the plate 5'. Thanks to the illuminating body 8 however preforms 1 <sic. 2> can in any case be illuminated from behind in relation to the capturing device 6. Such an illuminating body 8 is also conceivable for an embodiment with a projection screen 5.

Here it should be mentioned however that, with a testing system for testing of caps or other opaque or respectively semi-opaque (i.e. not transparent) workpieces and other objects, an illuminating body (not illustrated) should be provided above the plate 5', so that the workpieces to be checked can also be illuminated from above and not just from below. Of course several such lights can be used, and moreover it is also possible to do without, completely or partially, the illumination from behind (i.e. the illuminating body 8).

The images taken (a photo, an optical coherence tomogram or a multimodal picture) are transmitted by the capturing device 6 to the processing device. The images for testing of preforms are subsequently evaluated by this processing device.

With the testing for defects in the preforms (for example with the testing for deficient dimensions, shapes, wall thicknesses, the presence of pin holes, burns, foreign bodies, bubbles, too long injection points (so-called gates) etc.), identified first in the respective analyzed image are one or more preforms 7 which, when taking the picture, were aligned in such a way that their entire length can be seen as completely as possible in the image. These preforms 7 can, for example, be compared with a reference image of a correct preform in order to check the quality of the preform 7 to be tested with respect to the desired parameter (or respectively parameters). Thus, according to the invention, the preforms lying correctly with respect to their length, angular position, overlapping parts, etc. are each automatically detected in the image taken, so that they can be compared with a reference image.

In the case of the first embodiment with a projection screen 5, those preforms 7 are identified, for example, which during free fall and during the taking of the picture were aligned at such an angle with respect to the projection screen 5 that their entire length can be seen in the image as completely as possible. This means, concretely, that those preforms 7 are to be identified whose longitudinal axis (at the moment of taking of the picture) lies as parallel as possible to the projection screen 5. In FIG. 5*a*, for example, the preforms 7 could be selected which have the reference numerals.

In the case of the second embodiment with a plate 5', identified, for example, are those preforms 7 which are completely captured by the image, i.e. which lie completely in the picture range and are not covered by other preforms. With deviations from the reference image with respect to one or more parameters, conclusions can be drawn directly with respect to defects in the preform series. Instead of a reference image in the narrower sense, it is however also conceivable to use certain characteristic reference measurement values, which, in comparison, are then compared with the corresponding measurement values of the captured preforms to be tested.

Under certain circumstances this method does not allow all preforms 7 to be subjected to a test since, seen statistically, there can also be preforms 2 which, when sliding, are situated between the transport device 3 and the receiving vessel 4 in such a way that their image cannot be evaluated very well in the described manner. In the extreme case, it is moreover absolutely conceivable that no single image of preforms 2 in a picture is aligned in such a way their evaluation is possible by the processing device. Nevertheless these drawbacks can astonishingly be tolerated since it has been discovered that the same deficiencies often occur in a whole series (or in part of a series), so that the testing of a certain number among the preforms 7 is absolutely sufficient in order to be able to draw relevant conclusions about the quality of the entire series. In particular it is also important to note that in this way a continuous testing is possible, which, compared with a testing carried out as a spot check, leads to significantly more precise results. Furthermore non-defective parts of a series can be detected with this continuous testing, so that only defective portions have to be separated out, which is not possible with a testing carried out as random sample check.

In this context it is absolutely conceivable that the evaluation of every image is used immediately to draw conclusions about a whole preform series. On the other hand, it is also absolutely possible that first several images taken are evaluated before a conclusion about the quality of the entire series is reached.

According to the invention it is also possible moreover to offer the capturing device 6, the corresponding processing device, the projection screen 5, or respectively the plate 5' and the corresponding fixing means respectively together as a kit. In this case these elements can be easily installed by a person without specific training on a conventional production machine or respectively on a conventional production system for preforms and be put into operation. Thanks to this possibility, no adaptations would have to be carried out on the production machine itself.

Shown in FIGS. 6 to 9 are a second and a third variant of the system according to the second embodiment of the present invention. The systems according to these two variants of the present invention differ from the system illustrated in FIGS. 3 and 4 only in that the plate 5', over which the preforms 2 slide after leaving the transport device 3 and before entering the receiving vessel 4, is not designed flat. For this reason the elements in FIGS. 6 to 9 bear the same reference numerals as the elements in FIGS. 1 to 4.

Concretely, the plate 5' in the system according to the second variant of the invention (FIGS. 6 and 7) is curved in such a way that it is designed channel-shaped or respectively trough-shaped. As can be seen very well in FIG. 6, the plate 5' has a shape making it possible in principle for all preforms 2 coming from the transport device 3 to accumulate, during the sliding, in the middle of the plate 5' and to leave the plate 5' in the middle of the lower edge. In this way the position or respectively the focus of the capturing device 6 can be adapted such that the images of the sliding preforms 2 are able to be made in an optimal way. Thanks to the curved shape of the plate 5', the sliding preforms 2 are partially sorted, i.e. they inevitably orient themselves so that their longitudinal axes are disposed parallel to the sliding direction. Also this fact contributes to the imaging of the preforms 2 to be tested and their evaluation being able to be optimized. Albeit the preforms are unordered in such a way that different spacings apart can occur or the preforms point with one surface in opposite directions.

Figure 6:
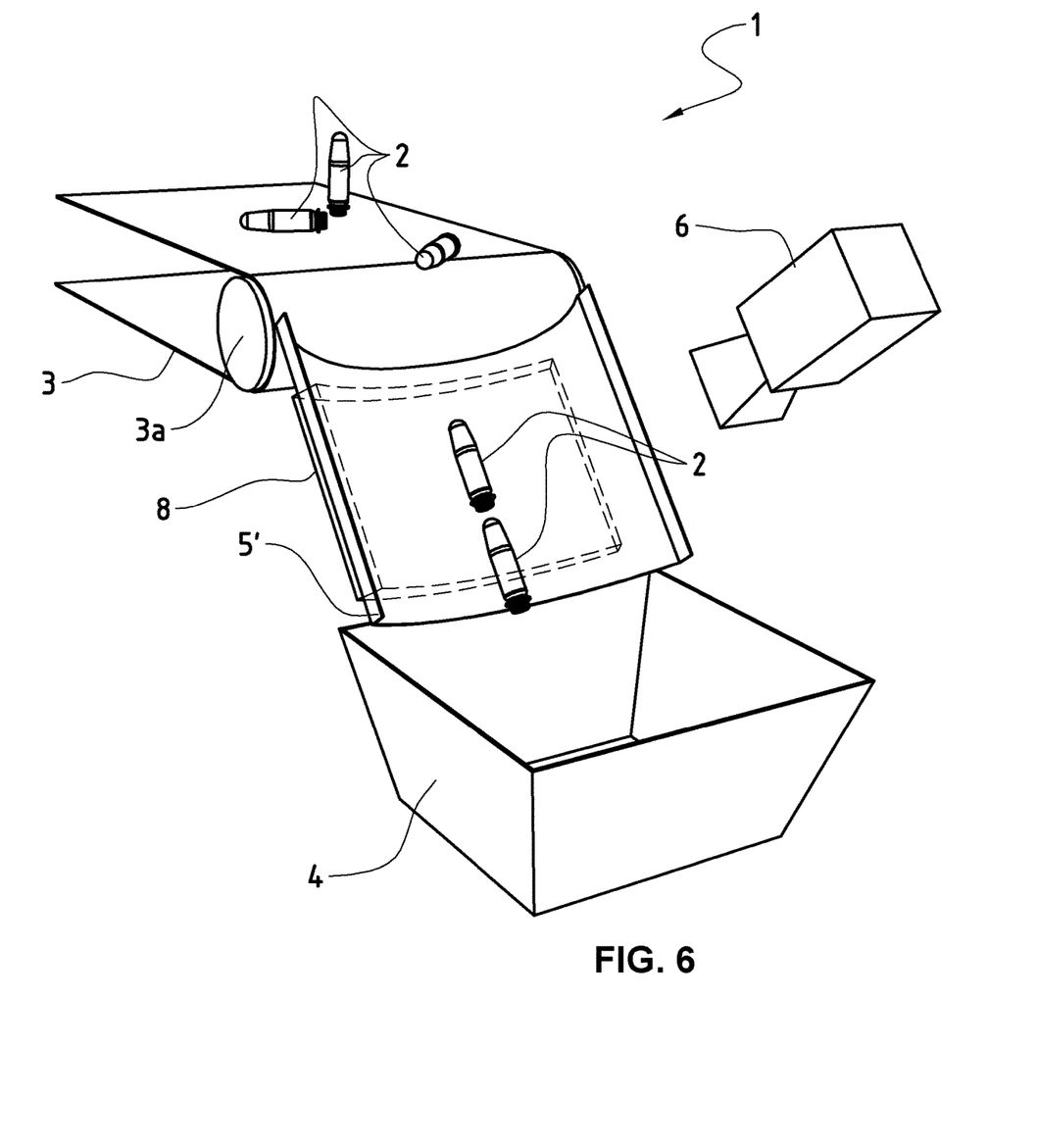
FIG. 6 shows schematically a perspective view from the front of a testing system according to another variant of the second embodiment of the present invention.
Figure 7:
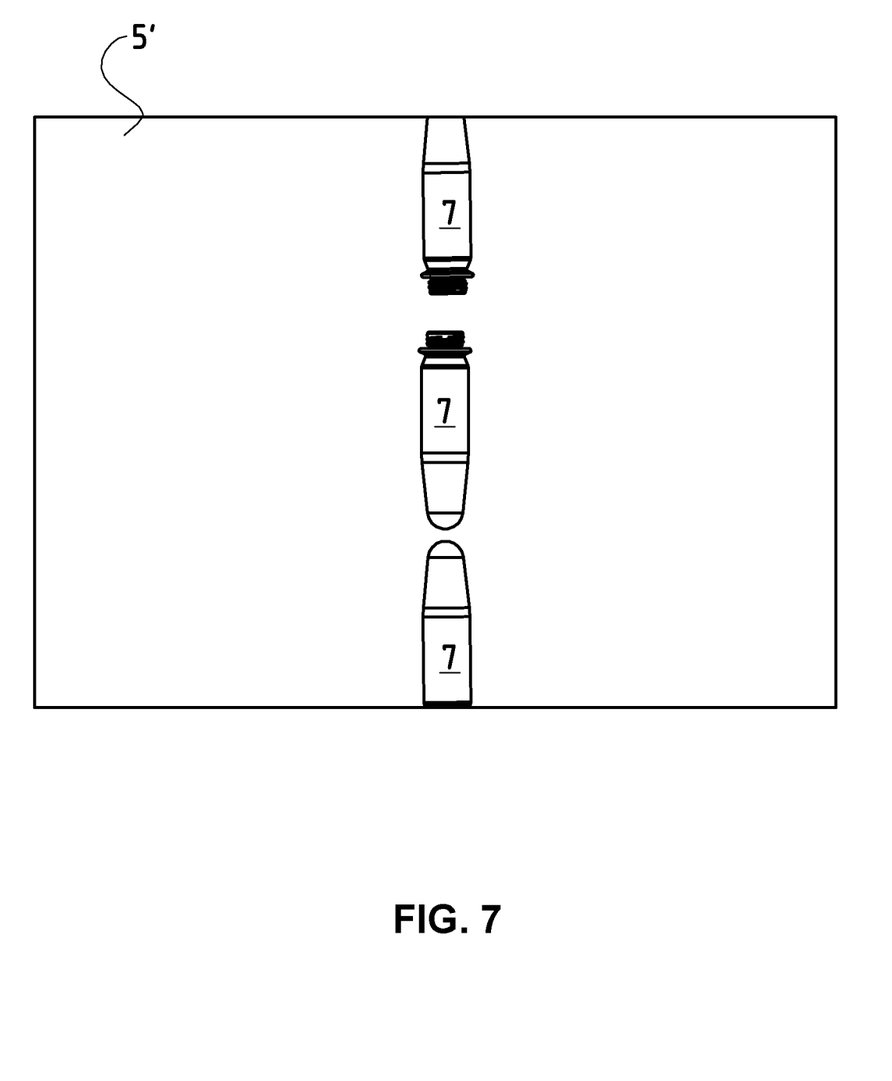
FIG. 7 shows schematically a representation of a possible image that is made by a capturing device in the testing system of FIG. 6 and is evaluated by a processing unit during the testing of preforms.

Of course it is also conceivable for the curvature of the plate to be disposed or designed differently from that shown in FIG. 6. One skilled in the art will however know how the curvature of the plate 5' can be adapted to special needs.

Figure 8:
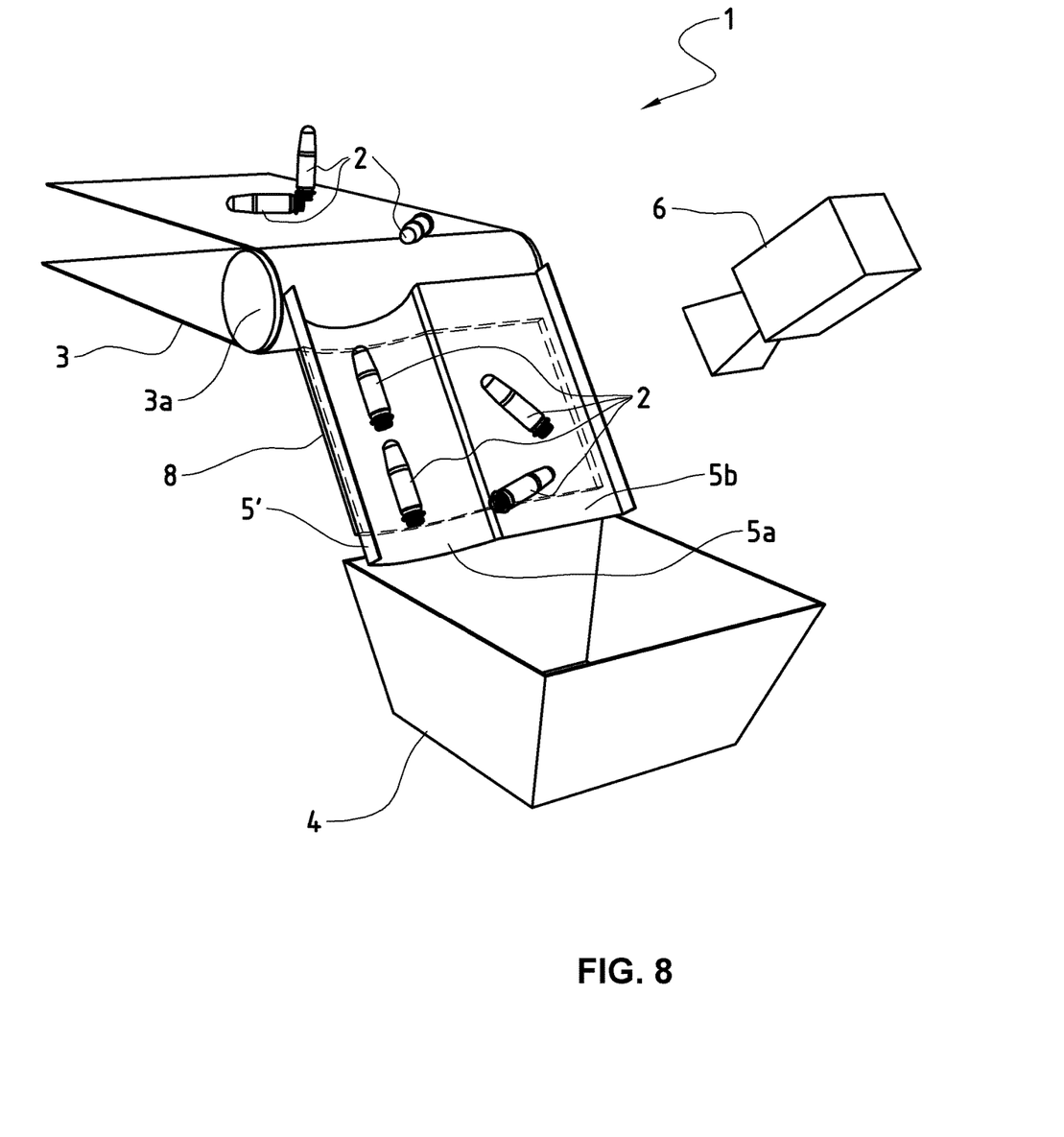
FIG. 8 shows schematically a perspective view from the front of a testing system according to still another variant of the second embodiment of the present invention.
Figure 9:
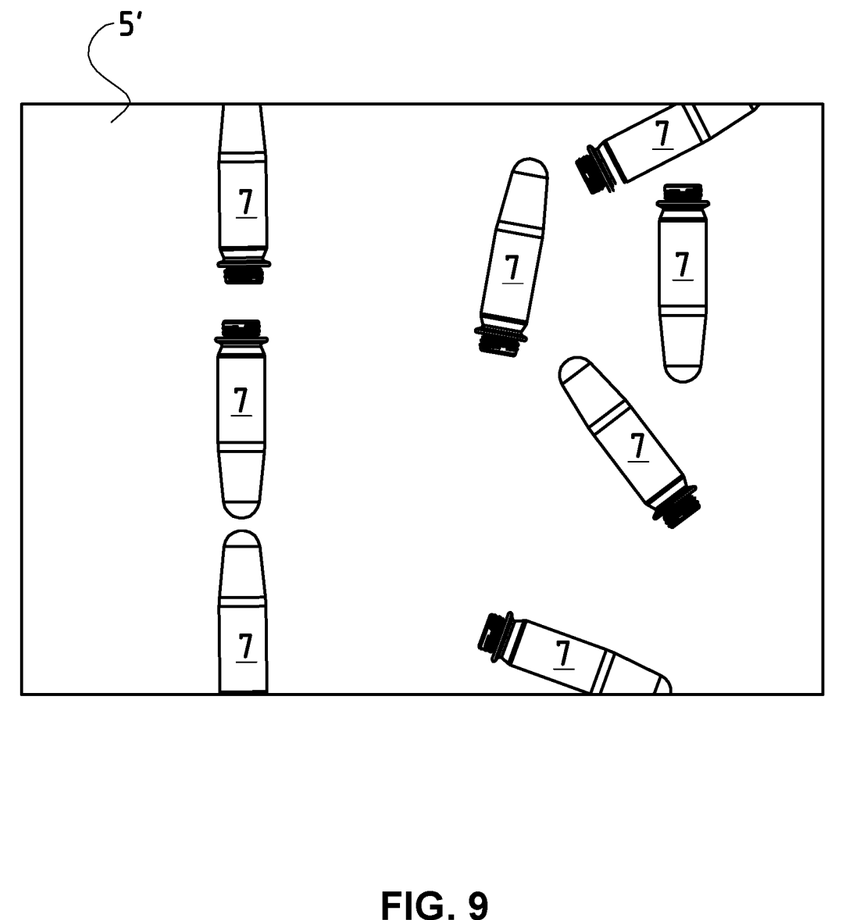
FIG. 9 shows schematically a representation of a possible image that is made by a capturing device in the testing system of FIG. 8 and is evaluated by a processing unit during the testing of preforms.

In particular it is also conceivable that not all of the plate 5' has a curvature. Such a variant is shown in FIGS. 8 and 9. In contrast to the variant shown in FIGS. 6 and 7, the plate 5' in FIG. 8 has a curved area 5a and a flat area 5b. With this variant, the advantages of the systems according to the first embodiment (FIGS. 1 and 2) and the second embodiment (FIGS. 3 and 4) of the present invention can be combined. With this variant it is therefore especially advantageous that two capturing devices 6 are provided, which each make images of preforms 2 in one of the two areas 5a and 5b of the plate 5'. Such a double arrangement is also possible however in the other cases.

Furthermore, in still another embodiment of the present invention, it would be possible for images of the preforms 2 not to be first made by the capturing device 6 after departure from the transport device 3 (i.e. while the preforms 2 are in free fall), but instead before, i.e. during the transport of the preform 2 on the transport device 3. For this purpose the capturing device 6 can be disposed over the transport device 3, so that it is focused on the upper side of the transport device 3. Images of the preforms 2 transported on the transport device 3 can then be made in that the transport device 3 is designed completely or partially transparent so that a sufficient illumination of the preforms 2 is possible. The images of the preforms 2 taken in this way correspond substantially to the images taken during free fall with or without projection screen 5 or the images taken during the sliding on the plate 5', so that the subsequent evaluation can take place in the same way.

It should still be said here that the present invention is not limited to the described embodiment. It will easily be clear to one skilled in the art that further developments and modifications are of course possible within the scope of the protected invention. Thus, for example, system elements can be substituted, according to needs, by other elements fulfilling the same (or similar) functions. It is also conceivable for the present method or respectively the present system not to be used exclusively for the testing of the color quality of preforms, but instead to check any other desired characteristics. Additional devices and/or elements can also be provided; for example a plurality of imaging units can also be provided, thanks to which the preforms 2 to be tested can be captured from different sides. Such measures and adaptations however fall within the scope of protection of the invention, which is defined by the following claims.

The invention claimed is:

1. A testing method, for testing workpieces for producing containers, including beverage bottles, the workpieces including a basic body and a barrier layer that is at least partially applied to the basic body,
   whereby the workpieces are transported into a receiving vessel by means of a transport device, and whereby an image of the workpieces is generated by means of a capturing device and is transmitted to a processing device for testing,
   wherein the workpieces are led into the receiving vessel upon leaving the transport device,
   wherein after leaving the transport device the workpieces are led orderless into the receiving vessel by sliding over a plate in such a way that they are introduced into the receiving vessel,
   whereby the image is generated of the sliding workpieces while the orderless workpieces are sliding over the plate, and
   wherein the image is processed by the processing device in such a way that the quality of the basic body and/or the quality of the barrier layer of the workpieces are tested in order to detect defective workpieces.

2. The testing method according to claim 1, wherein the image is a digital or analog photo, an optical coherence tomogram or a multimodal picture.

3. The testing method according to claim 1, wherein fixing means are provided with which a projection screen or the plate can be positioned.

4. The testing method according to claim 1, wherein a plurality of images are evaluated in order to draw conclusions about a defective series of workpieces.

5. The testing method according to claim 1, wherein when making the image the workpieces are illuminated by at least one illuminating body.

6. The testing method according to claim 5, wherein the at least one illuminating body is positioned in such a way that the workpieces are illuminated from the rear or from above in relation to the capturing device.

7. The testing method according to claim 1, wherein at least one portion of the plate is curved in at least one direction.

8. The testing method according to claim 7, wherein the plate is curved in such a way that at least one channel for the sliding workpieces is formed in the plate.

9. The testing method according to claim 1, wherein in addition to the detection of the defective workpieces, the imaging by the processing device is processed in such a way that the number of workpieces is determined.

10. The testing method according to claim 1, wherein the workpiece is a preform or a cap.

11. A testing system, for testing of workpieces for the production of containers, including beverage bottles, the workpieces including a basic body and a barrier layer that is at least partially applied to the basic body, comprising
    a transport device for transporting of workpieces into a receiving vessel, and
    a capturing device for making an image of the workpieces and transmitting this image to a processing device for testing, and
    wherein the workpieces are able to be led into the receiving vessel upon leaving the transport device,
    wherein after leaving the transport device the workpieces are led orderless into the receiving vessel by sliding over a plate in such a way that they are introduced into the receiving vessel,
    whereby the image is generated of the sliding workpieces when the orderless workpieces are sliding over the plate, and
    wherein the image is processed by the processing device in such a way that the quality of the basic body and/or the quality of the barrier layer of the workpieces is able to be tested in order to detect defective workpieces.

12. The testing system according to claim 11, wherein the image is a digital or analog photo, an optical coherence tomogram or a multimodal picture.

13. The testing system according to claim 11, wherein fixing means are provided with which a projection screen or the plate can be positioned.

14. The testing system according to claim 11, wherein an illuminating body is provided by means of which the workpieces are able to be illuminated when making the image.

15. The testing system according to claim 14, wherein the at least one illuminating body is positioned so that the workpieces are able to be illuminated from the rear or from above in relation to the capturing device.

16. The testing system according to claim 11, wherein a plurality of images are able to be evaluated in order to draw conclusions about a defective series of workpieces.

17. The testing system according to claim 11, wherein at least one portion of the plate is curved in at least one direction.

18. The testing system according to claim 17, wherein the plate is curved in such a way that at least one channel for the sliding workpieces is formed in the plate.

19. The testing system according to claim 11, wherein, instead of and/or in addition to the detection of the defective workpieces, the imaging by the processing device is able to be processed in such a way that the number of workpieces is able to be determined.

20. The testing system according to claim 11, wherein the workpiece is a preform or a cap.

21. A method for testing workpieces for producing containers, including beverage bottles, the workpieces including a basic body and a barrier layer that is at least partially applied to the basic body, comprising:
    transporting the workpieces into a receiving vessel by means of a transport device;
    generating an image of the workpieces by means of a capturing device; and
    transmitting the images of the workpieces to a processing device for testing;
    wherein the workpieces are led orderless into the receiving vessel by sliding over a plate in such a way that they are introduced into the receiving vessel upon leaving the transport device;
    wherein the image is generated of the sliding workpieces while the orderless workpieces are sliding over the plate; and
    wherein the image is processed by the processing device in such a way that the quality of the basic body and/or the quality of the barrier layer of workpieces are tested in order to detect defective workpieces.

22. A method for testing workpieces for producing containers, including beverage bottles, the workpieces including a basic body and a barrier layer that is at least partially applied to the basic body, comprising:
    transporting the workpieces into a receiving vessel by means of a transport device;
    generating an image of the workpieces by means of a capturing device; and
    transmitting the images of the workpieces to a processing device for testing;
    wherein the improvement comprises:
    that workpieces are led orderless into the receiving vessel upon leaving the transport device by sliding over a plate in such a way that the workpieces are introduced into the receiving vessel;
    the image is generated of the sliding workpieces while the orderless workpieces are sliding over the plate; and
    the image is processed by the processing device in such a way that the quality of the basic body and/or the quality of the barrier layer of workpieces are tested in order to detect defective workpieces.

23. The testing method of claim 1, comprising providing the plate between the transport device and the receiving vessel and sliding the workpieces over the plate, wherein the workpieces lie in the plane of the plate while sliding.

24. The testing method of claim 23, wherein the plane of the plate is at an optimal angle with respect to the capturing device.

25. The method for testing workpieces of claim 21, wherein all the workpieces lie in the same plane as the plate when generating the image.

* * * * *